United States Patent
Lee

(10) Patent No.: US 8,510,884 B2
(45) Date of Patent: Aug. 20, 2013

(54) PNEUMATIC SEAT CUSHION SYSTEM

(75) Inventor: Ralph Edward Lee, Inglebum (AU)

(73) Assignee: Comfort Concepts Pty Limited, Sydney, New South Wales (AU)

( * ) Notice: Subject to any disclaimer, the term of this patent is extended or adjusted under 35 U.S.C. 154(b) by 0 days.

(21) Appl. No.: 13/148,822

(22) PCT Filed: Feb. 19, 2010

(86) PCT No.: PCT/AU2010/000182
§ 371 (c)(1),
(2), (4) Date: Aug. 10, 2011

(87) PCT Pub. No.: WO2010/094072
PCT Pub. Date: Aug. 26, 2010

(65) Prior Publication Data
US 2011/0314609 A1    Dec. 29, 2011

(30) Foreign Application Priority Data
Feb. 20, 2009   (AU) .............................. 2009900717

(51) Int. Cl.
*B68G 5/00*    (2006.01)
*A47C 16/00*   (2006.01)

(52) U.S. Cl.
USPC ...................... 5/655.3; 5/654; 5/653; 5/655.9

(58) Field of Classification Search
USPC ................. 5/655.3, 654, 653, 655.9
See application file for complete search history.

(56) References Cited

U.S. PATENT DOCUMENTS

| | | | | |
|---|---|---|---|---|
| 4,306,322 A * | 12/1981 | Young et al. | | 5/706 |
| 5,785,669 A | 7/1998 | Proctor et al. | | |
| 6,519,797 B1 * | 2/2003 | Brubaker et al. | | 5/654 |
| 6,912,748 B2 * | 7/2005 | VanSickle | | 5/654 |
| 7,412,738 B2 * | 8/2008 | Chaffee | | 5/706 |
| 8,181,292 B1 * | 5/2012 | Pellettiere | | 5/654 |
| 2002/0108179 A1 * | 8/2002 | Kiser | | 5/654 |
| 2003/0137178 A1 | 7/2003 | Craft et al. | | |
| 2006/0162081 A1 * | 7/2006 | Kerekes et al. | | 5/654 |
| 2006/0225218 A1 * | 10/2006 | Zheng | | 5/655.5 |

(Continued)

FOREIGN PATENT DOCUMENTS

GB    1458099 A    12/1976

OTHER PUBLICATIONS

International Search Report dated Apr. 15, 2010.

*Primary Examiner* — Robert G Santos
*Assistant Examiner* — David E Sosnowski
(74) *Attorney, Agent, or Firm* — Cooper Legal Group, LLC

(57) ABSTRACT

A pneumatic seat cushion system (10) has a deformable cushion (11) having a seating surface (12) and a self inflating cushion bladder (14) positioned beneath the seating surface (12). The self inflating cushion bladder (14) has an airtight envelope (15) containing compressible material (16) which is in air communication (19) with a displacement bladder (18) such that when in use the airtight envelope (15) and the displacement bladder (18) form a closed system from which no air can enter or escape. When there is no person seated on the seating surface (12), the self inflating cushion bladder (14) is inflated and the displacement bladder (18) is deflated. When there is a person seated on the seating surface, the weight of the person compresses the compressible material (16) so as to partially deflate the self inflating cushion bladder (14) which results in the contained air passing into the displacement bladder (18) which becomes fully inflated.

5 Claims, 13 Drawing Sheets

(56) References Cited

U.S. PATENT DOCUMENTS

| | | | |
|---|---|---|---|
| 2007/0204406 A1* | 9/2007 | Thisse et al. | 5/655.3 |
| 2011/0025111 A1* | 2/2011 | Wornell et al. | 297/284.4 |
| 2011/0258782 A1* | 10/2011 | Call | 5/655.3 |
| 2012/0011656 A1* | 1/2012 | Daly | 5/652.1 |

* cited by examiner

PNEUMATIC SEAT CUSHION SYSTEM

TECHNICAL FIELD

This invention relates to seat cushions and more particularly to a pneumatic seat cushion system that automatically moulds to individual body shapes and provides postural support and comfort.

BACKGROUND ART

Existing self inflating adjustable seat cushions are designed to mould exactly to individual body shapes and provide postural support and comfort with the use of manually operated mechanical and electrical valve systems. Manually operated systems allow individual adjustment, particularly where a chair is frequently used by the same person. However, a manually operated system is not always suitable for use in many types of chairs as found in reception areas, conference centres, auditoriums, meeting rooms and transport, where the sitter may not be aware of the existence or benefits of a manually operated valve system or its method of operation. Furthermore, it would be preferable for the self inflating seat cushion to reinflate (reset) after the chair is vacated and before it is re-occupied by a different person.

An automatic system is therefore more appropriate for use in such chairs, to facilitate correct rotation of the pelvis and provide postural support and comfort without a need for manual intervention.

DISCLOSURE OF INVENTION

According to the invention there is provided a pneumatic seat cushion system comprising
(a) a deformable cushion having a seating surface,
(b) a self inflating cushion bladder positioned beneath the seating surface, the self inflating cushion bladder comprising an airtight envelope containing compressible material which is in air communication with a displacement bladder such that when in use the airtight envelope and the displacement bladder form a closed system from which no air can enter or escape;
the arrangement being such that when no person is seated on the seating surface, the self inflating cushion bladder is inflated and the displacement bladder is deflated and that when a person is seated on the seating surface, the seating surface compresses the compressible material so as to partially deflate the self inflating cushion bladder and displace sufficient air from it into the displacement bladder via one or more air passageways formed between the self inflating cushion bladder and displacement bladder, until the displacement bladder is fully inflated.

Preferably, the self inflating cushion bladder and displacement bladder are adjacent to each other under the surface of the cushion and are in air communication by means of one or more air passageways formed between the cushion bladder and displacement bladder.

Preferably, the self inflating cushion bladder and displacement bladder are joined along the circumference of the cushion bladder and where the one or more air passageways comprise vents formed in the join that permit air to pass between the cushion bladder and displacement bladder.

In an alternate embodiment, the self inflating cushion bladder and displacement bladder are remote from one another and the one or more air passageways are comprised of one or more tubes.

Preferably, the remote displacement bladder is located in the pelvic region of the back rest of a seat in which the pneumatic seat cushion system is installed into the seat bottom.

Preferably, a valve is located in the tube between the self inflating cushion bladder and the displacement bladder, so as to prevent shock inflation of the displacement bladder and to make the transition towards equilibrium barely noticeable.

It is also preferred that a relief valve is inserted into the self inflating self inflating cushion bladder so as to prevent the overexpansion of the self inflating cushion bladder in the event of a rise in the differential air pressure between the inside and the outside of the self inflating cushion bladder.

Preferably the relief valve is comprised at least of a plug adapted to be seated in an air passageway formed in the self inflating cushion bladder, and means for unseating the plug when the self inflating cushion bladder has achieved a certain level of inflation.

More preferably the relief valve comprises a bottom plate with a central aperture in air communication with an aperture of the self inflating cushion bladder and wherein the bottom plate is adapted to receive a plug for sealing the central aperture of the bottom plate, and wherein the plug is connected to the self inflating cushion bladder by a member of fixed length, such that in use, when the self inflating bladder reaches a certain level of inflation, the fixed length member transfers a pulling force to the plug which unseats it and in doing so, opens up the central aperture resulting in air communication between the inside and outside of the self inflating bladder through its aperture formed therethrough.

In an alternate embodiment of the invention there is provided a self inflating bladder for supporting a body part, the self inflating bladder comprising an airtight envelope containing compressible material which is in air communication with a displacement bladder such that when in use the airtight envelope and the displacement bladder form a closed system from which no air can enter or escape, the arrangement being such that when the self inflating bladder is not supporting a body part, the self inflating bladder is inflated and the displacement bladder is deflated and that when a body part is being supported by the self inflating bladder, the weight of the body part compresses the compressible material so as to partially deflate the self inflating bladder and displace sufficient air from it into the displacement bladder via one or more air passageways formed between the self inflating bladder and displacement bladder, until the displacement bladder is fully inflated.

BRIEF DESCRIPTION OF THE DRAWINGS

In order that the invention may be more readily understood and put into practical effect, reference will now be made to the accompanying drawings in which:—

MODES FOR CARRYING OUT THE INVENTION

Figure 1:
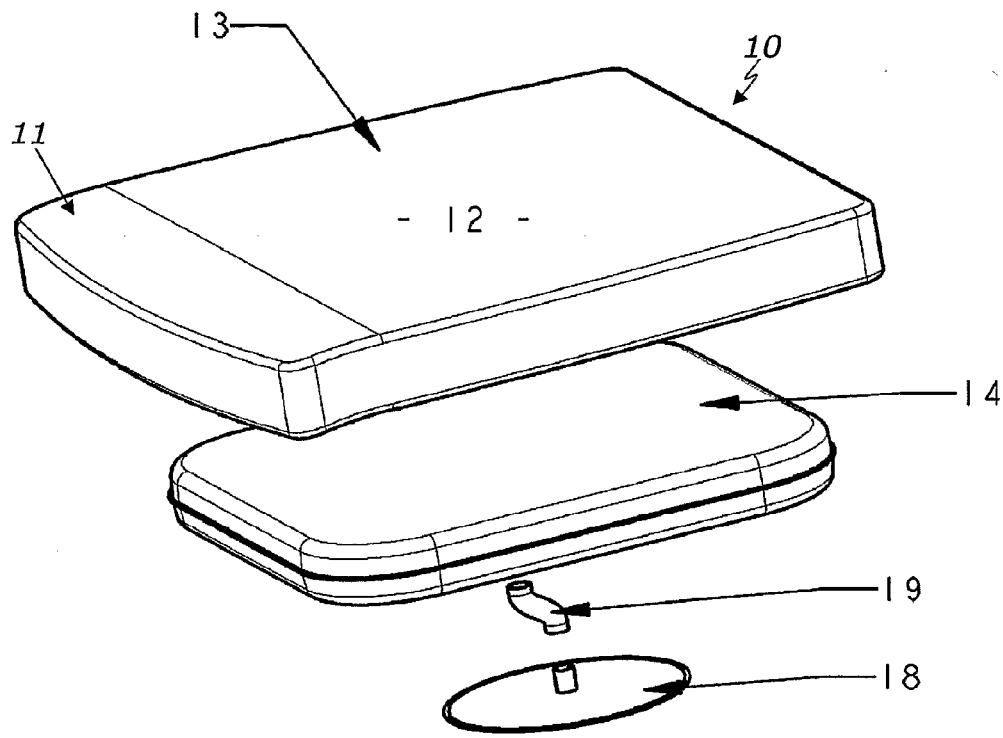
FIG. 1 is an exploded view from above of a pneumatic seat cushion system according to one embodiment of the invention.
Figure 2:
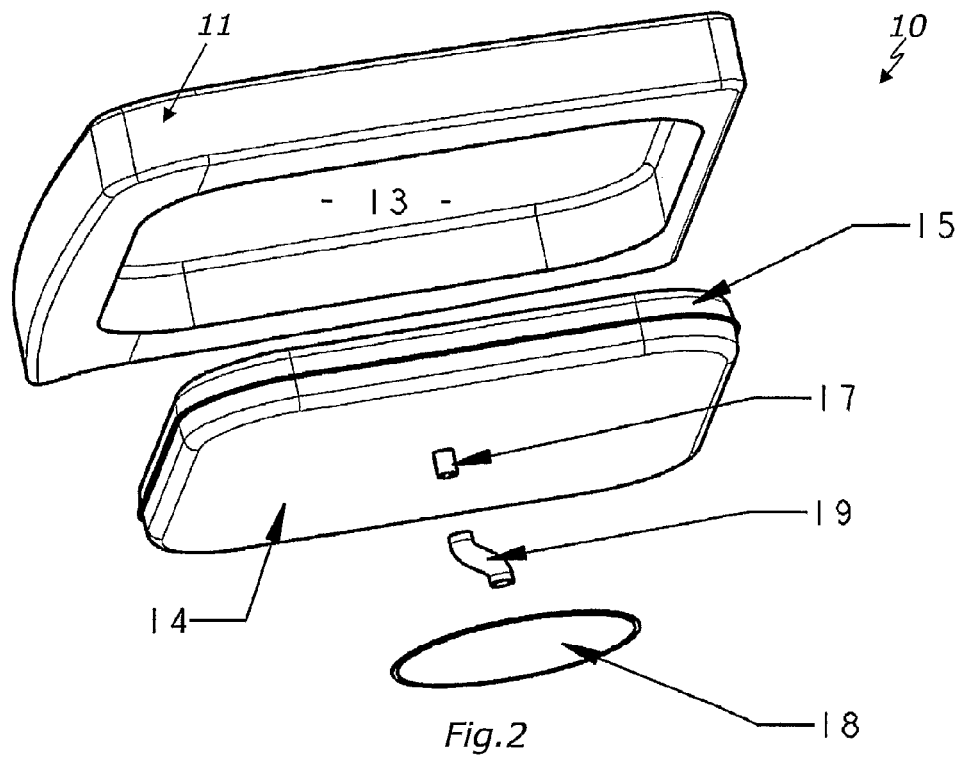
FIG. 2 is an exploded view from below of the pneumatic seat cushion system shown in FIG. 1.
Figure 3:
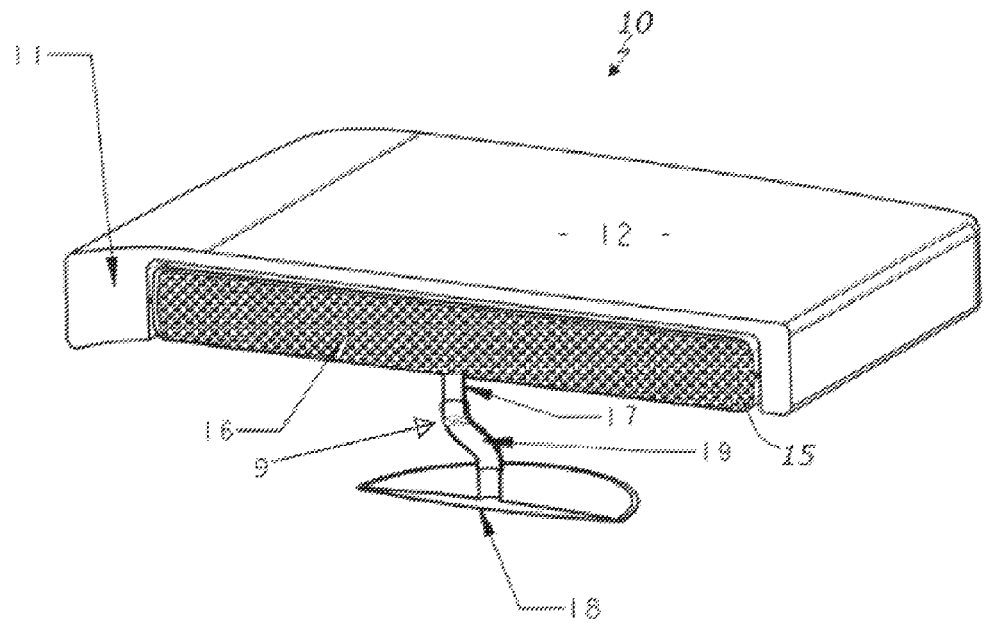
FIG. 3 is a cutaway perspective view of the pneumatic seat cushion system shown in FIGS. 1 and 2, when not in use with the self inflating cushion bladder fully inflated and the displacement bladder deflated.

As depicted in FIGS. 1, 2 and 3, the pneumatic seat cushion system 10 shown in the drawings consists of a foam cushion 11 with upholstery that has a seating surface 12 and a recess 13 in its underside. Within the recess 13 and adjacent to the seating surface 12 there is a self inflating cushion bladder 14 which consists of an airtight envelope 15 that contains compressible material 16 including, as an example, an open cell foam. Air enters and leaves the airtight envelope 15 through a port 17 that is connected to a displacement bladder 18 by a connecting tube 19 so as to form a closed system.

Figure 4:
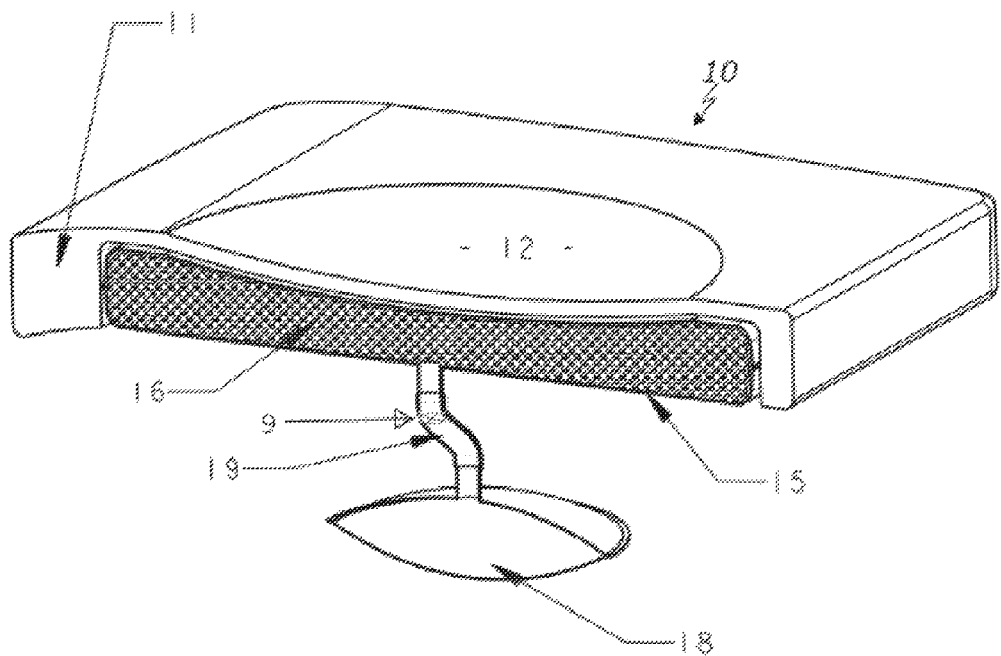
FIG. 4 is a view similar to FIG. 3 with the deformable cushion compressed by a person seated on the seating surface, with the self inflating cushion bladder partly compressed and the displacement bladder inflated.
Figure 5:
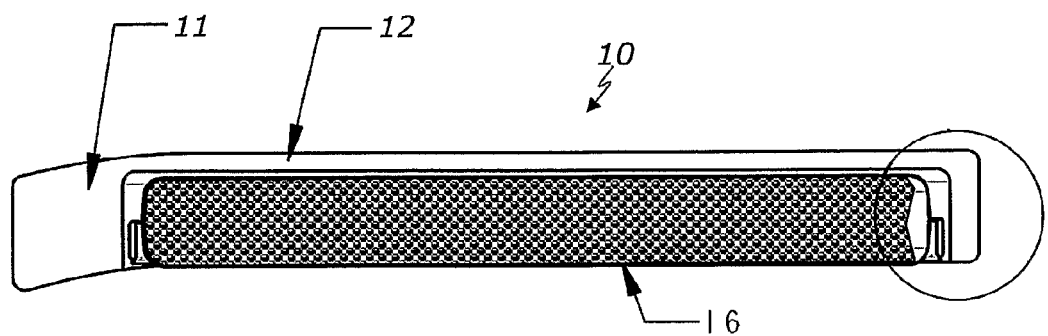
FIG. 5 is a sectional side view of a cushion according to a second embodiment of the invention when not in use.
Figure 6:
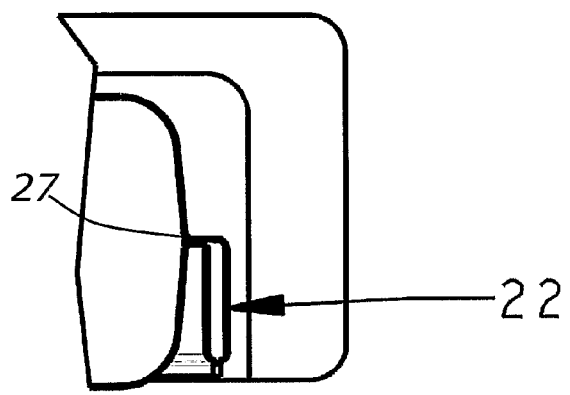
FIG. 6 is a partially magnified side view of the cushion of FIG. 5.
Figure 7:
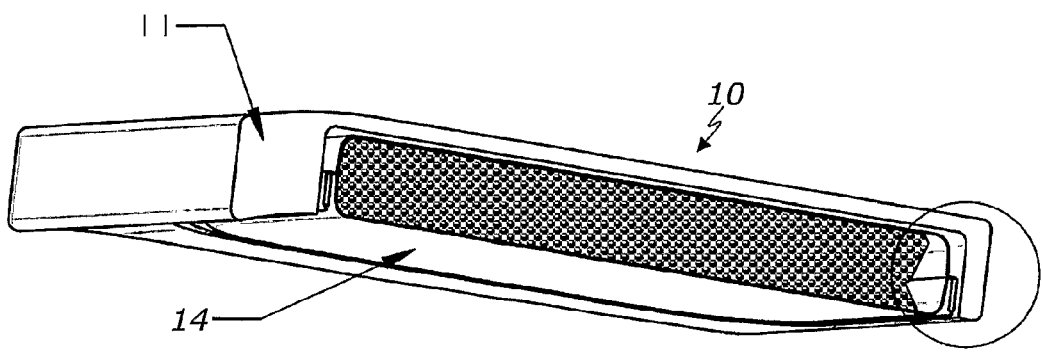
FIG. 7 is a partial cutaway perspective rear view of a cushion according to the second embodiment of the invention when not in use.
Figure 8:
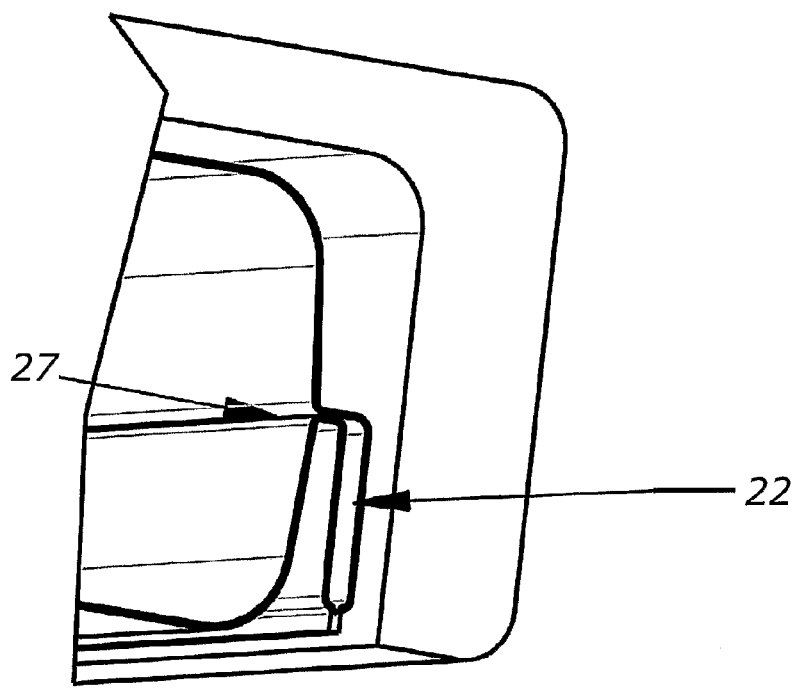
FIG. 8 is a partially magnified perspective view of the cushion of FIG. 7.
Figure 9:
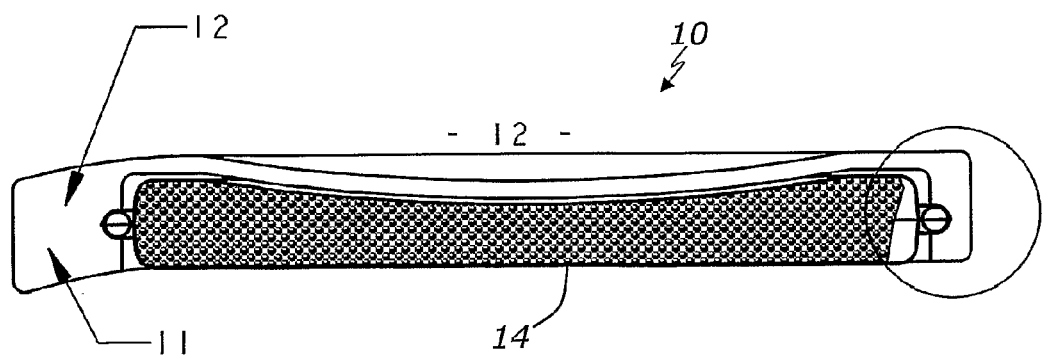
FIG. 9 is a partial cutaway side view of a cushion according to the second embodiment of the invention when in use (body seated but not shown).
Figure 10:
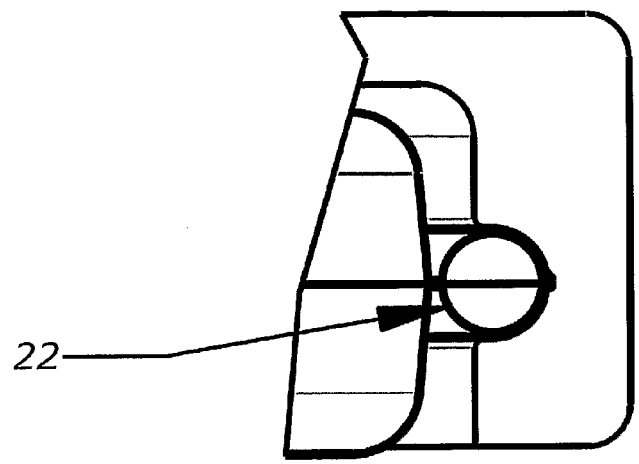
FIG. 10 is a partially magnified perspective side view of the cushion of FIG. 9.
Figure 11:
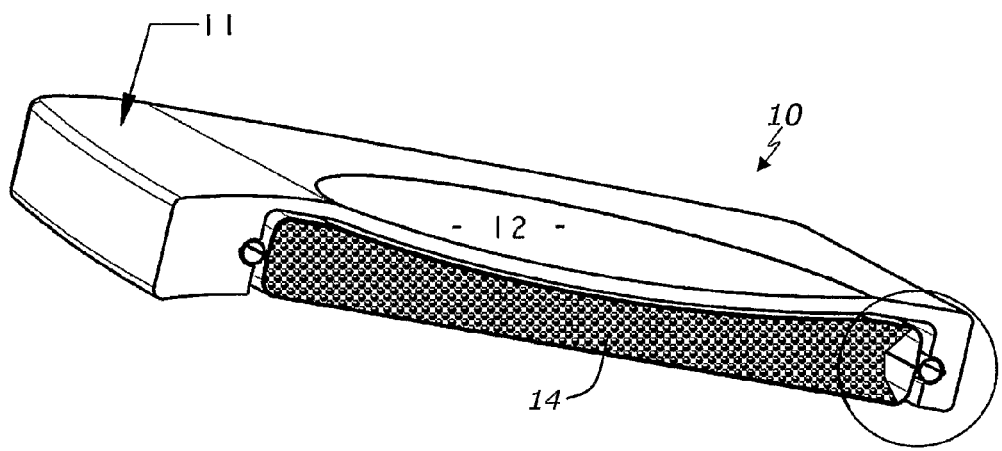
FIG. 11 is a partial cutaway perspective overhead view of a self inflating cushion bladder according to the second embodiment of the invention.
Figure 12:
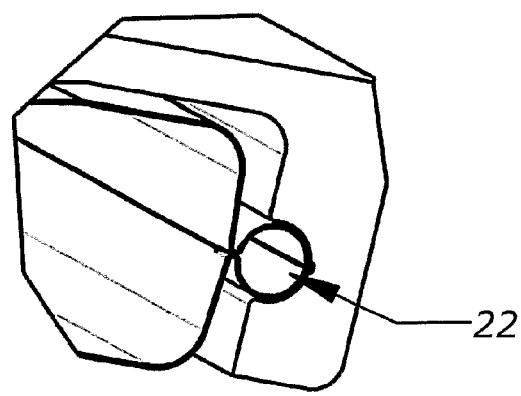
FIG. 12 is a partially magnified perspective view of the self inflating cushion bladder of FIG. 11.

When the seat cushion system is not in use, the self inflating cushion bladder 14 is fully inflated and the displacement bladder 18 is deflated as shown in FIGS. 1, 2 and 3. When a person sits on the seating surface 12, the compressible material is compressed and air is displaced from the self inflating cushion bladder into the displacement bladder 18 via the port 17 and tube 19 until equilibrium is reached as shown in FIG. 4. The connecting tube 19 may incorporate a restrictor or valve 9 to prevent shock inflation of the displacement bladder 18 and to make the transition towards equilibrium barely noticeable.

The pneumatic seat cushion system of the invention can be incorporated into a chair with the cushion being on the seat portion of the chair and the displacement bladder being below the seat of the chair. Alternatively, the bladder can be placed anywhere in or on the chair including in the back rest of the chair, adjacent to the chair or remote from the chair.

Depicted in FIGS. 5 through 12 is a second embodiment of the invention which is comprised of cushion 11 which contains the self inflating cushion bladder 14 and a displacement bladder 22. The displacement bladder 22 is located in a region of the cushion 11 which has been adapted to receive the displacement bladder by having a void in the cushion as depicted in FIGS. 5 through 8.

Figure 13:
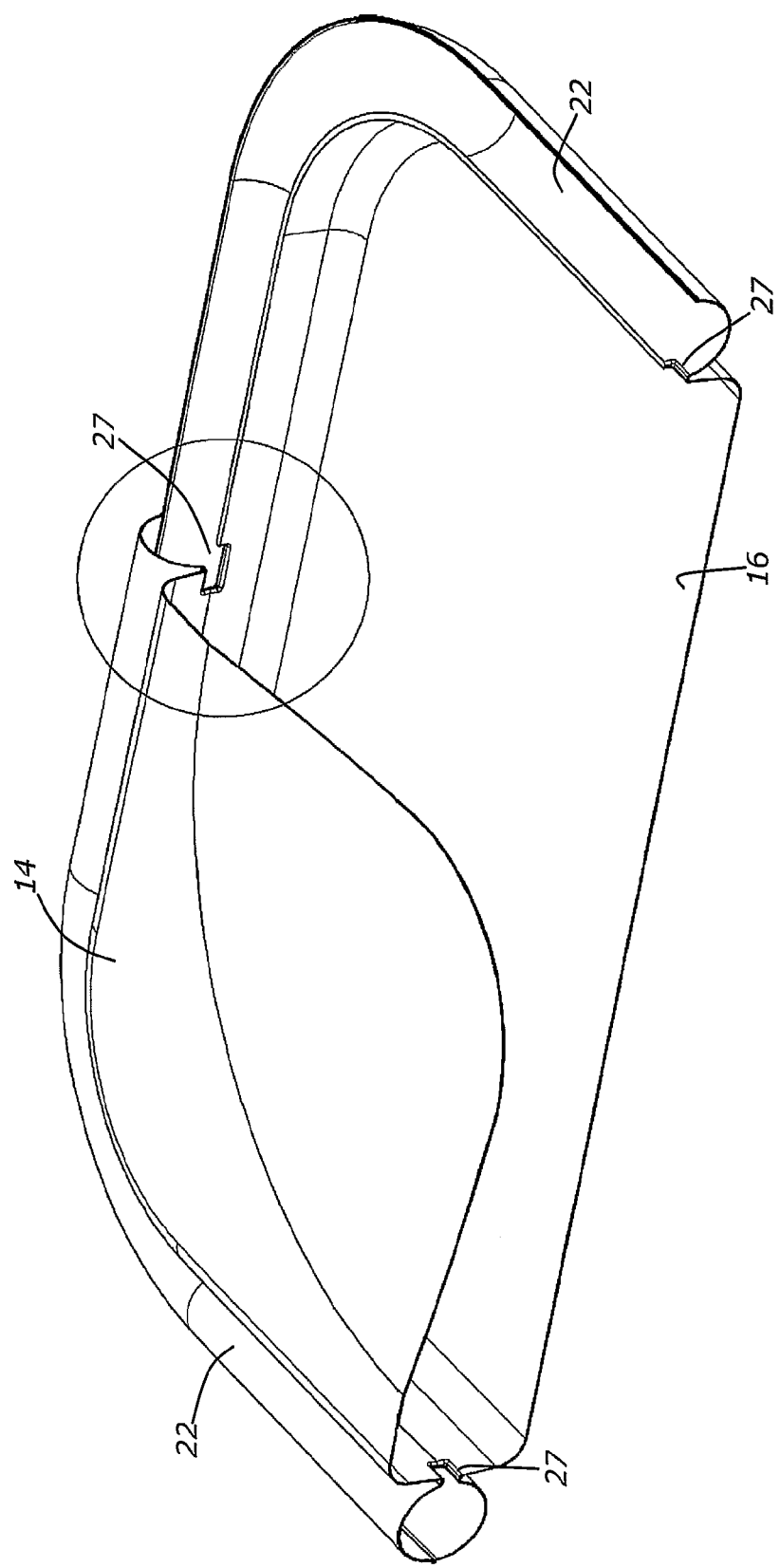
FIG. 13 is a perspective and sectional view showing the self inflating cushion bladder and the displacement bladder connected via air passageways.
Figure 14:
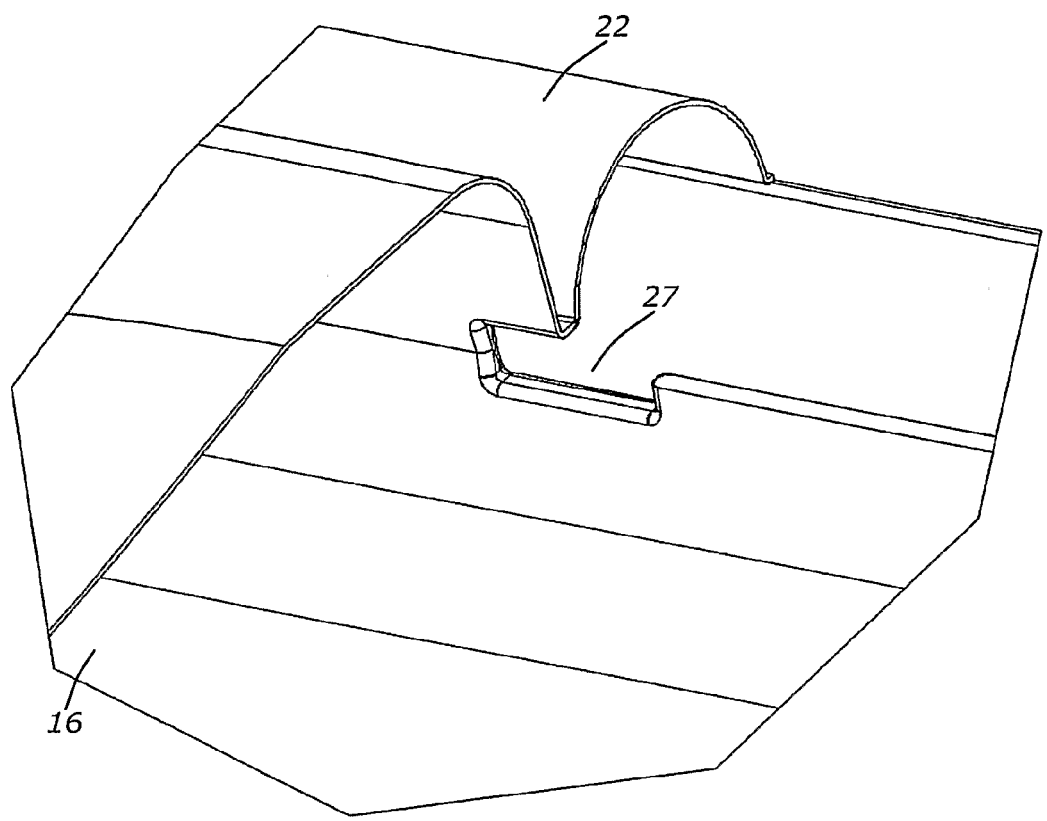
FIG. 14 is a partially magnified perspective view of an air passageway of FIG. 13.

Referring to FIG. 13, the self inflating cushion bladder 14 and displacement bladder 22 are connected via air passageways in the form of vents 27 between the self inflating cushion bladder 14 and displacement bladder 22. In the embodiment depicted in FIGS. 5 to 13 the displacement bladder 22 is formed integral with the self inflating cushion bladder 14 and is formed by a substantially continuous inner weld around the circumference of the cushion bladder 14 and a continuous outer weld where the displacement bladder 22 is formed between the inner weld and outer weld. One or more vents 27 are formed by leaving gaps in the inner weld between the self inflating cushion bladder 14 and displacement bladder 22.

Depicted in FIGS. 15 to 21 is a relief valve 28 which is designed to be inserted into the self inflating cushion bladder 14 for the prevention of overexpansion in the event of a rise in the differential air pressure between the inside and the outside of the self inflating cushion bladder. Relief valves may also be utilised in other self inflating cushion bladders that remain in a closed state until a valve is operated to cause the ingress or egress of air to and from the bladder. The incorporation of relief valves in a self inflating cushion bladder 14, or other self inflating cushion bladders, is particularly necessary when the cushions they are incorporated into are seat cushions that are used in aircraft seats that may be subjected to a rapid aircraft decompression event.

In the event of a rise in the differential air pressure between the inside and outside of the self inflating cushion bladder, beyond a predetermined level, the relief valve will automatically open and cause the air pressure on the inside of the self inflating cushion bladder to equalise with the air pressure on the outside of the bladder.

Figure 15:
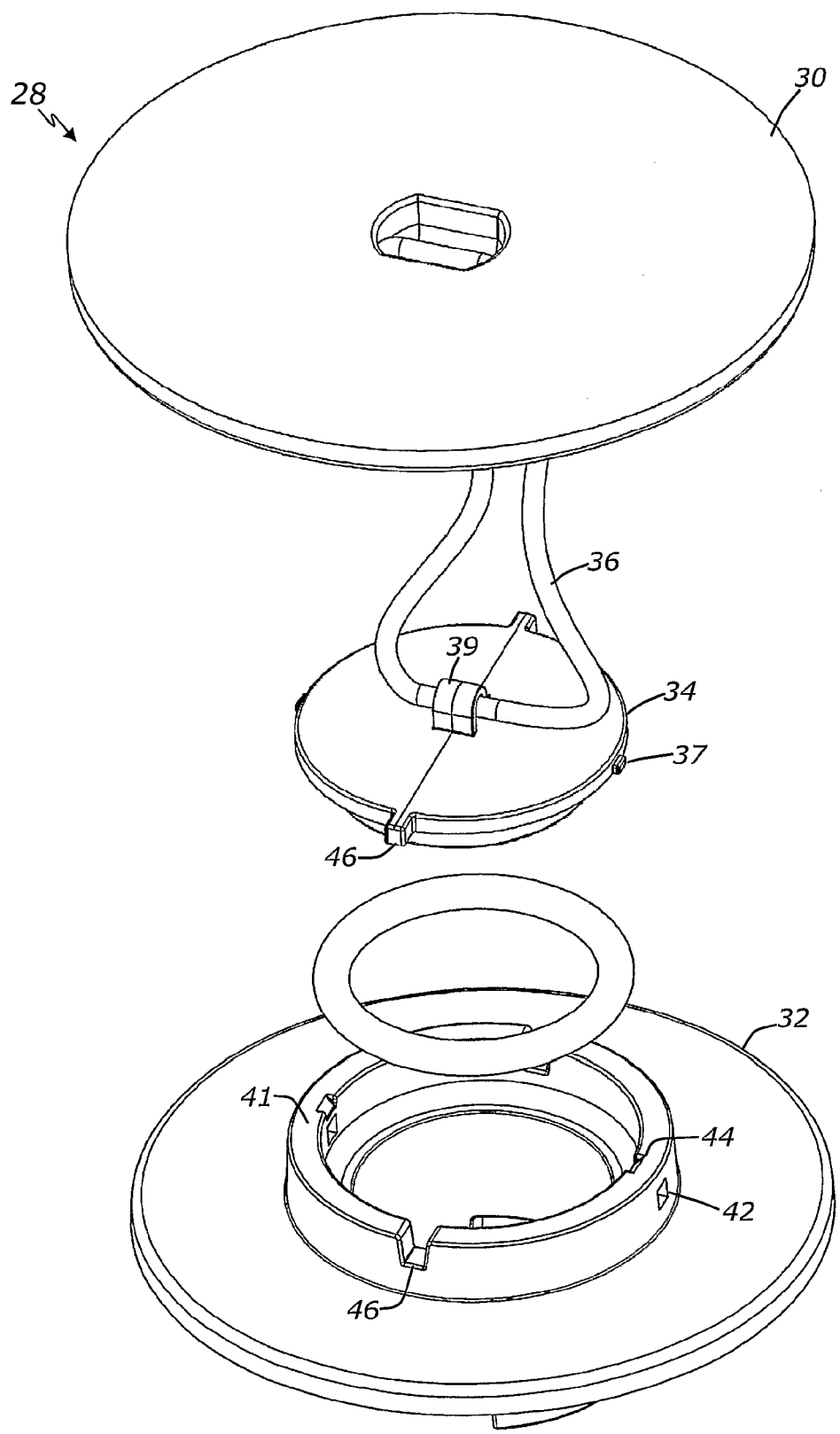
FIG. 15 is an exploded perspective view of a relief valve for use in a cushion according to the second embodiment of the invention as viewed from the top side.
Figure 16:
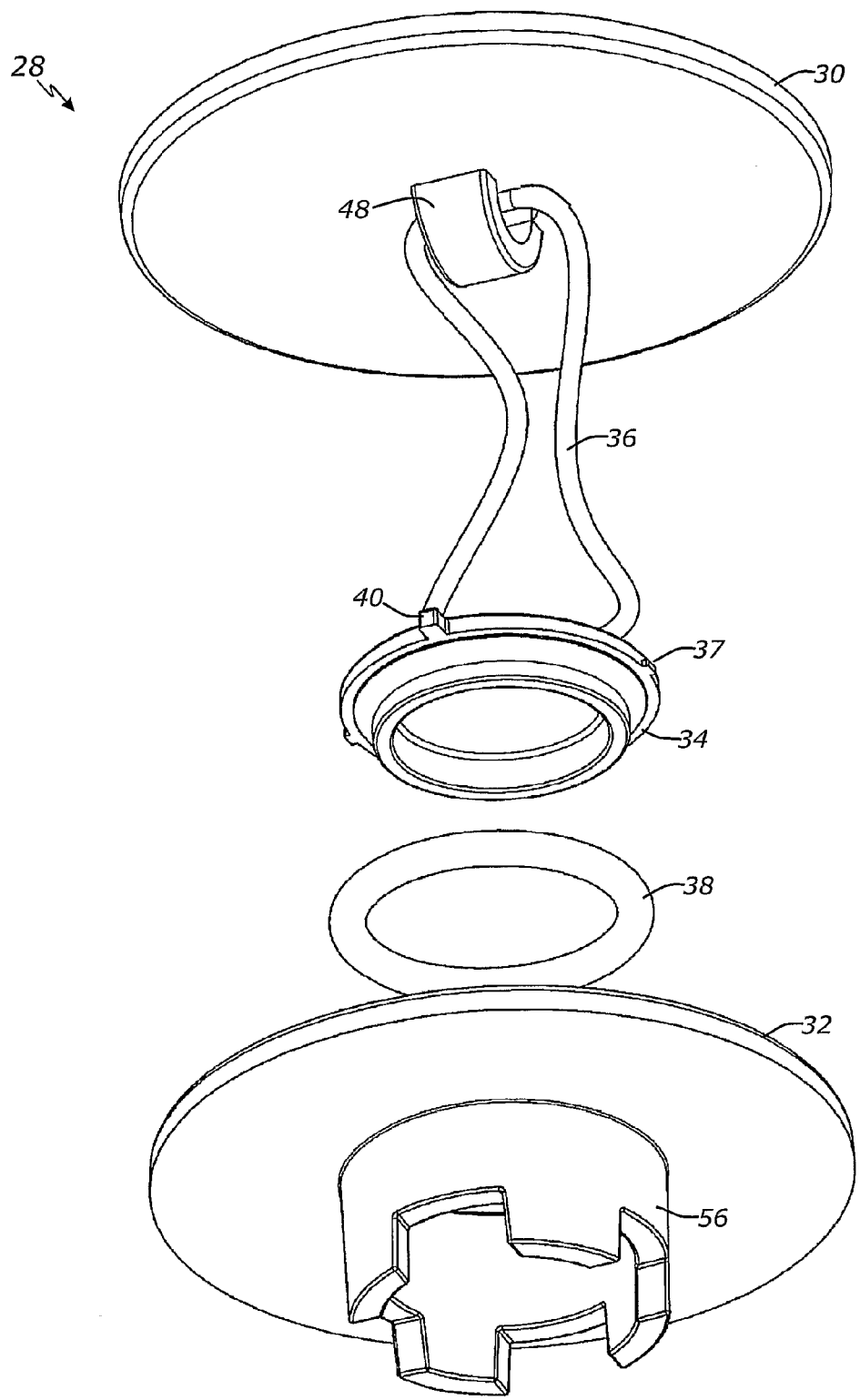
FIG. 16 is an exploded perspective view of a relief valve installed in a cushion according to the second embodiment of the invention as viewed from the bottom side.
Figure 17:
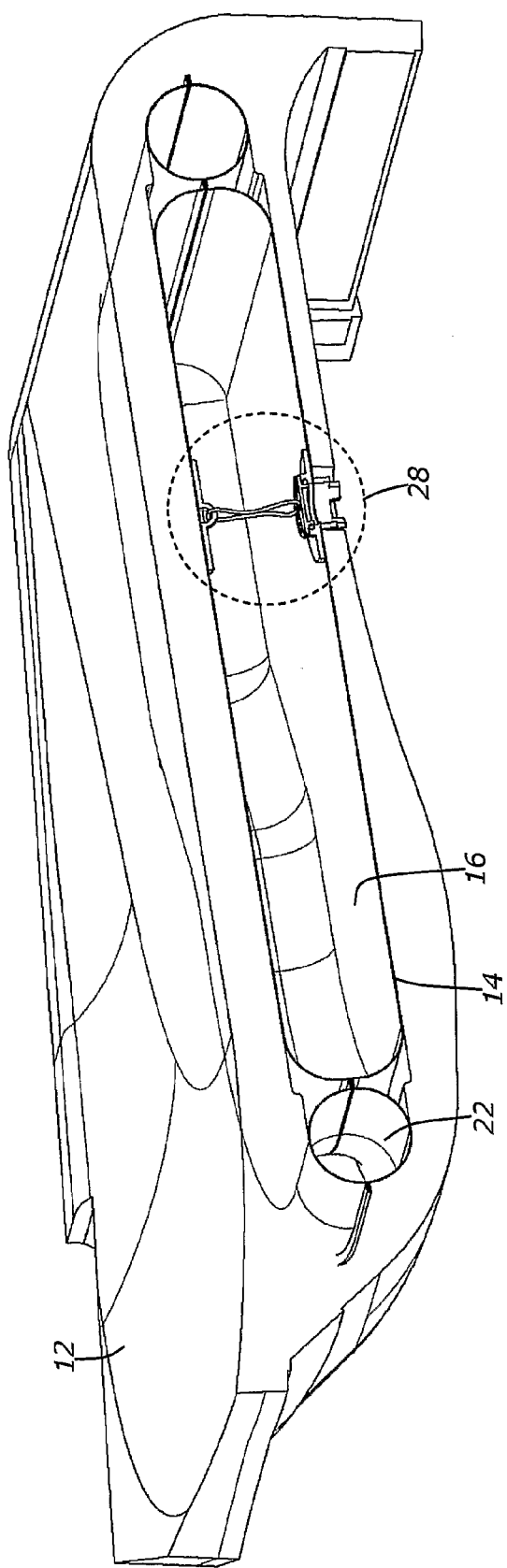
FIG. 17 is a cutaway perspective view of the relief valve of FIG. 16 incorporated into a cushion of the second embodiment of the invention.

FIGS. 15 and 16 show exploded perspective views of the relief valve 28. Relief valve 28 is comprised of top valve plate 30 and bottom valve plate 32. As depicted in FIG. 17, the top valve plate 30 is attached to the top inside surface 52 of the self inflating cushion bladder 14 and the bottom valve plate 32 is attached to the bottom inside surface 54 of the self inflating cushion bladder 14, and which extends through an aperture formed into the bottom surface 54 of the self inflating cushion bladder 14.

Referring to FIGS. 15 to 21, other components of the relief valve 28 include O-ring 38, plunger 34, ripcord 36 for connecting the plunger 34 to the top valve plate 30 via connectors 48 and 39 located on the top valve plate 30 and plunger 34 respectively. The plunger 34 is positioned by locating lugs 40 into notches 46 in the annular ridge 41. When so positioned, the relief valve 28 provides an airtight seal when the plunger 34 is seated against O-ring 38 located in the annular ridge 41 of the bottom valve plate 32. The plunger 34 is maintained in its seated position in the bottom valve plate 32 through the interaction of tabs 37 of the plunger 34 and ramp 44 and aperture 42. When fully inserted into the annular ridge 41 of the bottom valve plate 32, the tabs 37 of the plunger slide down past the ramps 44 of the annular ridge 41 of the bottom valve plate 32 and into the apertures 42 formed in the annular ridge 41 of the bottom valve plate 32. Once located in the apertures 42, the tabs 37 prevent the plunger 34 from being removed from the annular ridge 41 of the bottom valve plate 32.

Figure 18:
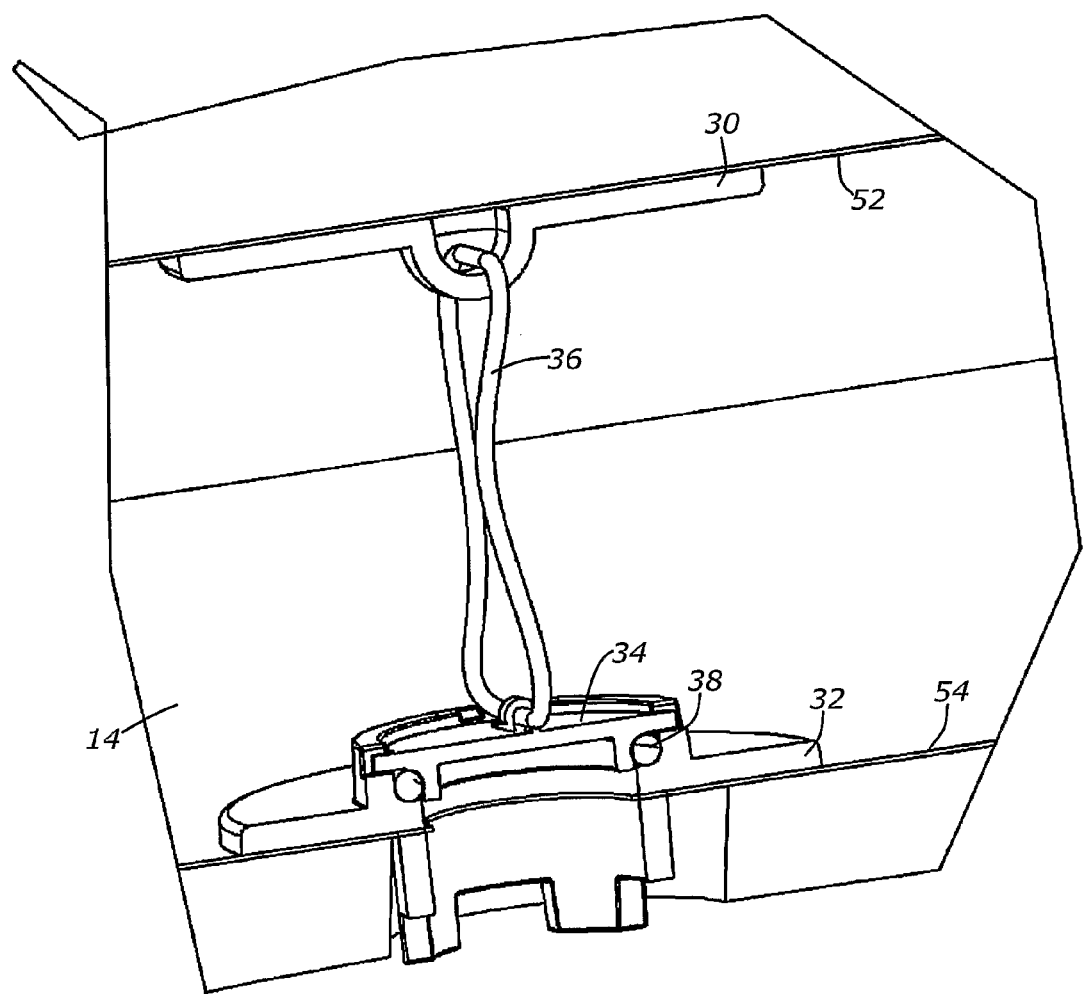
FIG. 18 is a magnified cutaway perspective view of the relief valve as depicted in FIG. 17.
Figure 19:
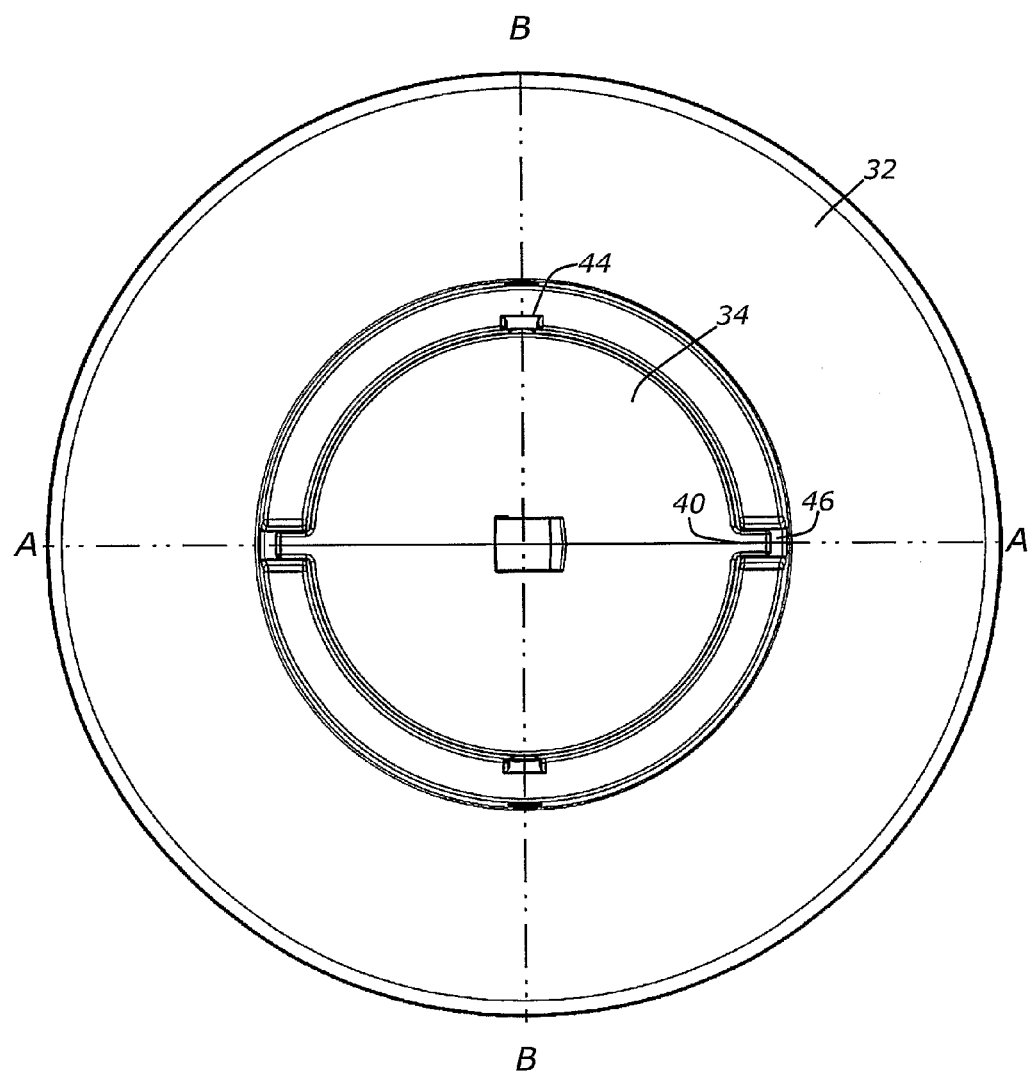
FIG. 19 is top plan view of the base plate of the relief valve of FIG. 15.
Figure 20:
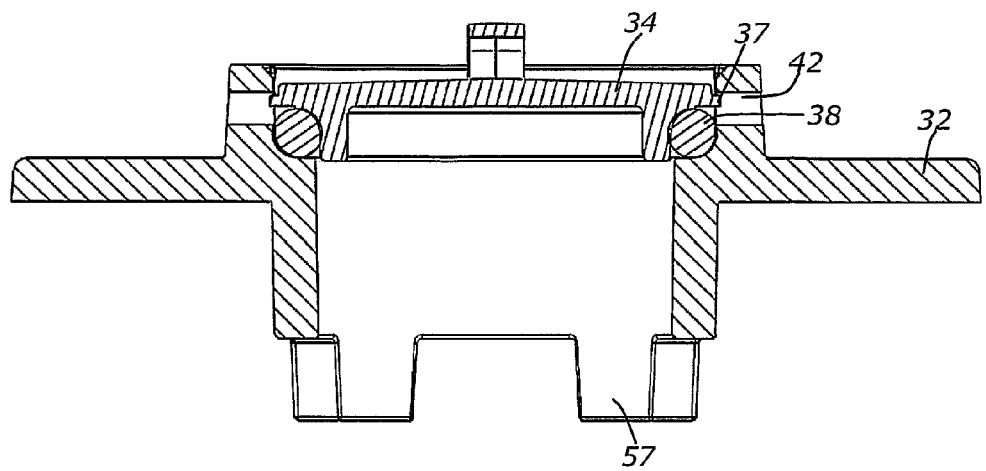
FIG. 20 is a first side sectional view of the base plate of the relief valve of FIG. 15 taken through Section B-B.
Figure 21:
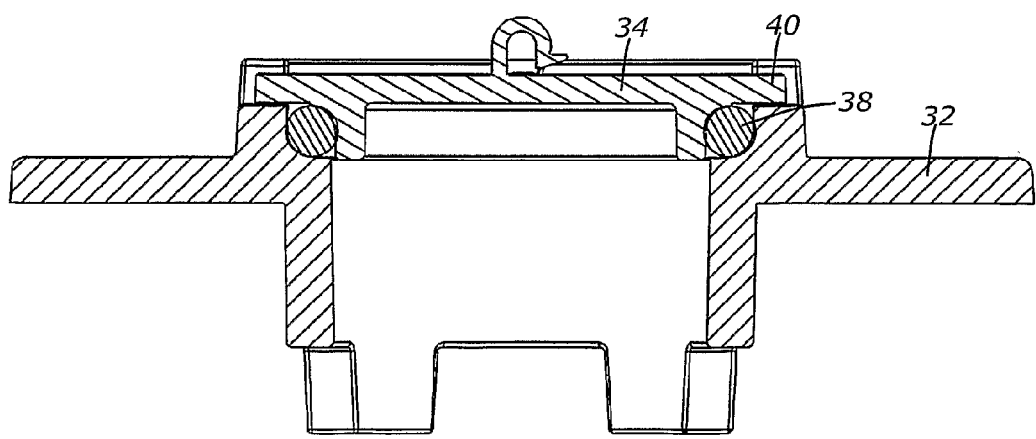
FIG. 21 is a second side sectional view of the base plate of the relief valve of FIG. 15 taken through Section A-A.

In use, and as depicted in FIGS. 17 and 18, in the event of a rise in the differential air pressure between the inside and outside of the self inflating cushion bladder 14, the distance between the top surface 52 with the attached top valve plate 30 and the bottom surface 54 with the bottom valve plate 32 will increase and the ripcord 36 would at first become taut and, thereafter, would translate the force of the expanding self inflating cushion bladder 14 onto the two opposite sides of the cushion bladder (52 and 54 of FIG. 18) into a pulling force. At the point when the differential air pressure between the inside and outside of the self inflating cushion bladder reaches a predetermined level, the plunger 34 of the relief valve 28 will become unseated from the annular ridge 41 allowing the air pressure within the self inflating cushion bladder 14 to equalise with the air pressure outside the self inflating cushion bladder 14 thus preventing further expansion of the self inflating cushion bladder 14.

The relief valve can be used on seat cushions of the first or second embodiment of the present invention, and other cushions incorporating sealed or sealable self inflating cushion bladders.

Referring to FIG. 13, the person skilled in the art will appreciate that the self inflating cushion bladder 14 can be used as a self inflating bladder outside of the foam cushion 11 to support individual body parts. For instance, the self inflating cushion bladder 14 may be used on its own as a posture support, a head rest (or pillow), arm or limb supports, or as a portable cushion for placement on a hard seat, In such cases the only modification that would be preferable would be a upholstered or fabric skin to surround the air tight envelope 15. In such application, it is optional to include a resealable opening in the air tight envelope 15 such that when not in use, the seal for the resealable opening (plug, stopper or other sealing means) can be opened and the contained air expelled by rolling or flattening the device so that it can be carried and/or stored in a compact state. The feature of providing the resealable opening in the airtight bladder 15 of the self inflating cushion 14 can also be incorporated into the cushion 10.

Various modifications may be made in details of design and construction without departing from the scope and ambit of the invention. For example, the displacement bladder 18 need not be located underneath the cushion bladder, but may be to one side, or behind the cushion bladder, or otherwise placed where it best suits the application of the invention to a seat.

INDUSTRIAL APPLICABILITY

The pneumatic seat cushion system as described in various forms and embodiments in the specification is particularly useful for incorporation into vehicular seating systems, and is especially applicable to aircraft seating systems.

Moreover, the self inflating cushion bladder, depicted in FIG. 13, may also be used in other self inflating supports, cushions and therapeutic devices that would otherwise use a pneumatic valve as a means of adjustment.

The invention claimed is:

1. A pneumatic seat cushion system comprising
(a) a deformable cushion having a seating surface for resting the buttocks and legs of a seated person,
(b) a self inflating cushion bladder positioned beneath the seating surface, the self inflating cushion bladder comprising an airtight envelope containing compressible material which is in air communication with a displacement bladder such that when in use the airtight envelope and the displacement bladder form a closed system from which no air can enter or escape;
the arrangement being such that when there is no weight applied to the seating surface, the self inflating cushion bladder is configured to self inflate and the displacement bladder is configured to deflate such that the self inflating cushion bladder is fully inflated while the displacement bladder is deflated and that when weight is applied to the seating surface, as when a person is seated on the seating surface, the weight on the seating surface compresses the compressible material so as to partially deflate the cushion bladder and displace sufficient air from it into the displacement bladder via one or more air passageways formed between the cushion bladder and displacement bladder, until the displacement bladder is fully inflated.

2. The pneumatic seat cushion system of claim 1, wherein the cushion bladder and displacement bladder are remote from one another and the one or more air passageways are comprised of one or more tubes.

3. The pneumatic seat cushion system of claim 1, further comprising a valve located in the one or more air passageways, so as to prevent shock inflation of the displacement bladder.

4. A self inflating bladder for supporting a body part, the self inflating bladder comprising an airtight envelope containing compressible material and wherein the self inflating bladder is in air communication with a displacement bladder such that when in use the airtight envelope and the displacement bladder form a closed system from which no air can enter or escape, the arrangement being such that when the self inflating bladder is not supporting a body part or otherwise not bearing any weight, the self inflating, bladder is configured to self inflate and the displacement bladder is configured to deflate such that the self inflating cushion bladder is fully inflated while the displacement bladder is deflated and that when a body part is being supported by the self inflating bladder, the weight of the body part compresses the compressible material so as to partially deflate the self inflating bladder and displace sufficient air from it into the displacement bladder via one or more air passageways formed between the self inflating bladder and displacement bladder, until the displacement bladder is fully inflated.

5. The pneumatic seat cushion system of claim 1 wherein when no weight is applied to the seating surface, air is configured to flow from the displacement bladder, through the connecting tube, and into the self inflating cushion bladder until the self inflating cushion bladder is fully inflated and the displacement bladder is deflated.

* * * * *

UNITED STATES PATENT AND TRADEMARK OFFICE
CERTIFICATE OF CORRECTION

PATENT NO. : 8,510,884 B2
APPLICATION NO. : 13/148822
DATED : August 20, 2013
INVENTOR(S) : Ralph Edward Lee It is certified that error appears in the above-identified patent and that said Letters Patent is hereby corrected as shown below:

On the title page item [75]: please delete "Inglebum" and insert --Ingleburn--.

Signed and Sealed this
Fifteenth Day of October, 2013

Teresa Stanek Rea
*Deputy Director of the United States Patent and Trademark Office*